Sept. 27, 1966   L. R. KOWALSKI   3,275,025
BALL VALVE
Filed Oct. 16, 1963
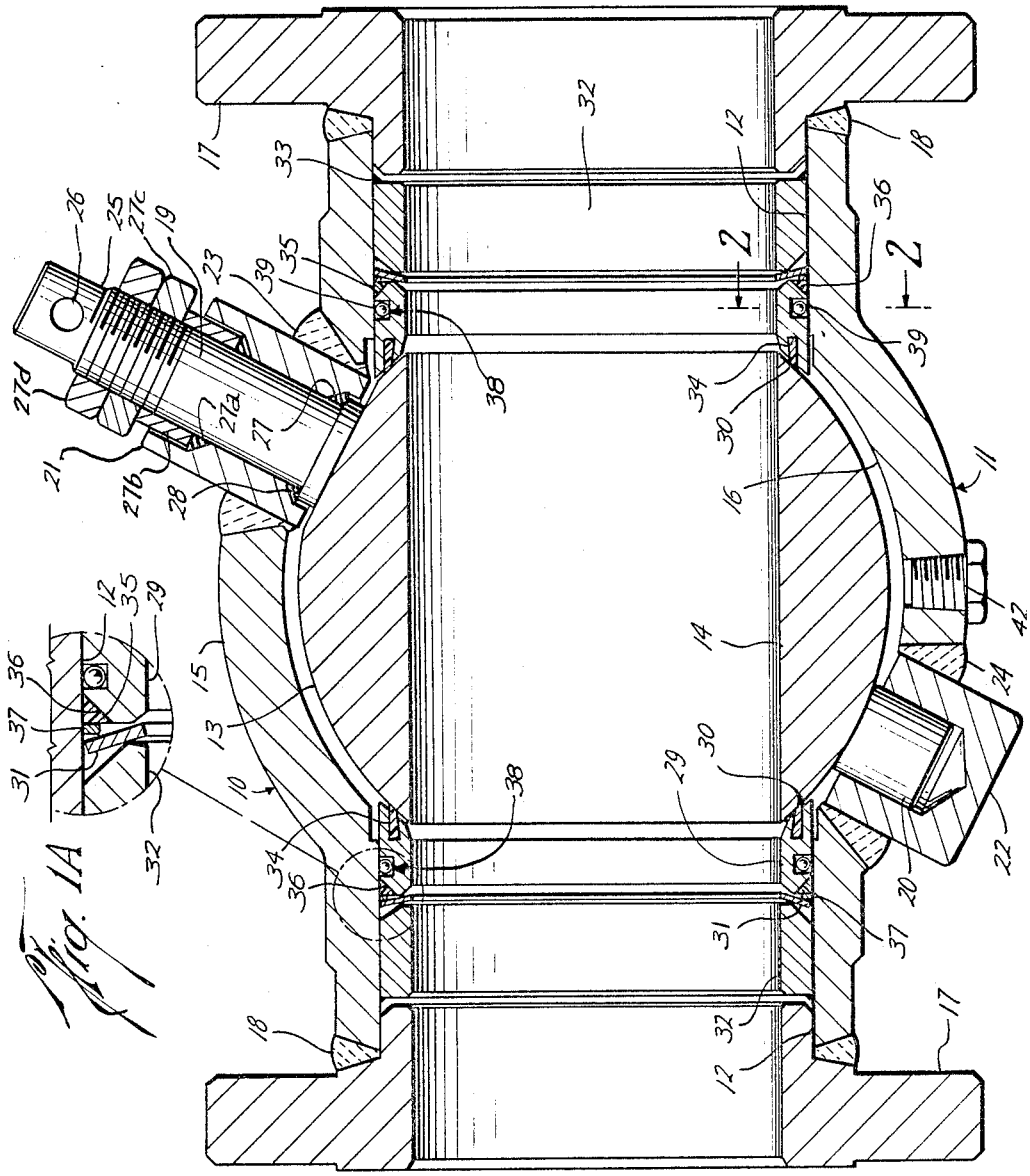
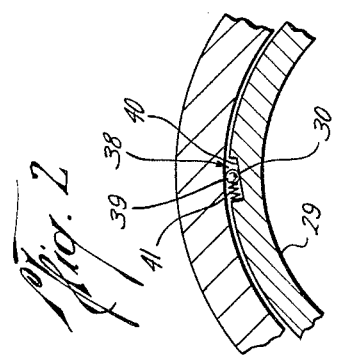
Ludwig R. Kowalski
INVENTOR.
BY Browning, Jenner, Hyer & Eickerrott
ATTORNEYS

United States Patent Office 3,275,025
Patented Sept. 27, 1966

3,275,025
BALL VALVE
Ludwig R. Kowalski, Belleville, N.J., assignor to Cameron Iron Works, Inc., Houston, Tex.
Filed Oct. 16, 1963, Ser. No. 316,598
6 Claims. (Cl. 137—330)

This invention relates generally to a novel ball valve of the type in which a seat engageable with the plug thereof is caused to move between different rotational positions with respect to the plug automatically in response to operation of the plug. As disclosed in U.S. Patent No. 2,977,975, valves having seats which are so rotated are useful in distributing wear about the seat and thereby prolonging its life.

An object of this invention is to provide a valve of this type which is of compact construction, which requires a minimum number of parts, and which is relatively inexpensive to manufacture.

In the ordinary ball valve, there is no tendency for the sliding of the plug past the inner ends of the seats to rotate the seats in either direction about their axes, during opening and closing movement of the plug, because the frictional forces between the plug and inner ends of the seats are equal about the circumference of the seats. However, as distinguished from the ordinary plug valve, the plug and seat of the valve of this invention are so arranged with respect to the valve body and relative to one another as to create an imbalance of these frictional forces so that the seat is caused to rotate to various positions about its axis during operation of the valve.

For this purpose, the plug is mounted within the body for rotation between opened and closed positions about an axis which is disposed at an acute angle with respect to the seat axis. Thus, one portion of the inner end of the seat engages with the plug at a greater radial distance from the axis of rotation of the plug than a diametrically opposed portion of the inner end of the seat. As a result, the plug is moved past this first-mentioned portion of the seat with a proportionately greater linear speed than it is moved past the other portion of the inner end of the seat. Since the coefficient of friction between any two surfaces varies with the relative sliding speed therebetween, there is a correspondingly greater circumferential force on the one seat portion than the other and the seat is thereby urged about its axis in the direction of the greater force. In accordance with the preferred embodiment of the invention, the seat is free to rotate within the body and about its axis in one direction, while its rotation in the opposite direction is opposed or retarded, as by means of a brake or one-way clutch. Thus, during each cycle of operation of the valve, the seat is caused to move from one position about its axis to another.

Polytetrafluoroethylene, known generally as "Teflon," is particularly well suited for use as a valve-seating surface due to its lubricity, its resistance to corrosion, etc. Its use as a seating surface in the valve of the present invention is even more desirable due to the fact that its coefficient of friction varies substantially with the relatively low speeds at which plug valves are operated. Thus, use of this material as a seating surface between the inner end of the seat and the plug of the valve of this invention results in a relatively high force urging the seat about its axis during opening and closing movement of the plug, thereby insuring the above-described movement of the seat.

A still further characteristic of polytetrafluoroethylene which makes it especially suitable for use in this invention is its extremely low coefficient of friction at very low speeds. Consequently, it is possible to seal between the seat and valve body with a static ring of the same material, and thereby reduce resistance to seat rotation to a minimum.

In the drawings, wherein like reference characters are used throughout to designate like parts:

FIG. 1 is a longitudinal sectional view of a ball valve constructed in accordance with the present invention, and with the plug thereof in flowway-opening position;

FIG. 1A is an enlarged detail view of the encircled portion of the valve seat shown in FIG. 1; and FIG. 2 is a cross sectional view of a portion of the seat and valve body on one side of the plug, as seen along broken line 2—2 of FIG. 1, and showing the one-way clutch in an inverted position.

With reference now to the details of the above-described drawings, the ball valve shown in FIG. 1, and designated in its entirety by reference character 10, comprises a body 11 having a flowway 12 therethrough and a plug 13 rotatably mounted within the flowway for opening and closing same. As shown, the plug is ball shaped and has an opening 14 therethrough which is alignable with the flowway in one rotative position to open same, as shown in FIG. 1, and disalignable from the flowway in another rotative position so as to dispose a solid portion of the plug across same for closing the flowway.

The body 11 includes a main portion 15 which comprises separate parts welded along their lengths for disposal closely about the plug. As can be seen from FIG. 1, this main body portion includes a tubular extension on each side of an enlarged chamber 16 concentric with the plug. Flanges 17 are welded at 18 or otherwise secured to the opposite ends of the tubular extensions of the body portion 15 so as to provide means for connecting the body in a pipeline.

Stems 19 and 20 on the upper and lower sides, respectively, of the plug 13 are rotatably mounted within axially aligned bearings 21 and 22 which are connected with body portion 15 by means of weldments 23 and 24, respectively. More particularly, the lower bearing 22 is closed while the upper bearing 21 is open to permit the outer end 25 of stem 19 to extend therethrough. This outer end may have a hole 26 therethrough or be otherwise formed to permit the attachment of a suitable tool for rotating the plug 13 about the aligned axes of stems 19 and 20.

A ring 27 carried within a conical counterbore on the lower end of the bearing 21 engages outwardly facing shoulder 28 on the stem 19 to seal thereabout as it resists the outward thrust of such stem. Another ring 27a carried within a conical counterbore on the outer end of bearing 21 is engaged by a sleeve 27b surrounding the stem, and the sleeve is held down on the ring 27a by a nut 27c which is locked in place by another nut 27d. Thus, the ring 27a also seals about the stem as it resists the inward thrust of the stem.

An annular seat 29 is mounted within flowway 12 on each side of plug 13 for sealably engaging with the plug. More particularly, the inner end 30 of each seat is urged inwardly against the plug by means of a washer-type spring 31 held between the outer end of the seat and an annular retainer ring 32 welded at 33 to the flowway. Preferably, the inner diameters of the seat 29, retainer ring 32, and flange 17 are the same as that of the opening 14 through the plug 13 so that there is relatively little obstruction to flow through the valve in its open position.

In a preferred embodiment of the invention, a seal ring 34 is carried on the inner face of the seat 29 to provide the inner end 30 which engages the plug. Another seal ring 35 is disposed between the seat and the flowway 12 of the valve body to seal therebetween and thereby permit fluid pressure within the flowway to supplement the force of the spring 31 in urging the inner end of the seat against the plug. As previously described, one sealing material which has been found particularly suitable for these purposes in other valves, and which has even more utility in the present invention, is polytetrafluoroethylene, generally known as "Teflon."

The ring 35 is triangular in cross section and bears against a tapered shoulder 36 on the outer end of the seat. It is held in sealing engagement between the seat and flowway by means of the washer-type spring 31, preferably through a bearing ring 37, as best shown in FIG. 1A. Thus, the spring 31 performs the dual purpose of urging the inner end 30 of the seat into engagement with the plug and also urging the seal ring 35 into sealing engagement between the seat and flowway.

As distinguished from the ordinary ball valve, the stems 19 and 20 and thus the axis of rotation of the plug of this valve are disposed at an acute angle with respect to the axis of the seats 29 and thus the flowway 12 in which the seats are mounted. Since the inner end 30 of each seat engages plug 13 along a mean plane which is perpendicular to the axis of the seat, the upper portion of the inner end of the right-hand seat (FIG. 1) is disposed at a shorter radial distance from the axis of rotation of the plug than the lower portion of such seat. Consequently, the surfaces of the plug will slide by the lower portion of the right-hand seat at a greater linear speed than they will slide by the upper portion of said seat. Conversely, the upper portion of inner end 30 of the left-hand seat is disposed at a greater radial distance from the axis of rotation of the plug than the lower portion of the left-hand seat, so that the surfaces of plug 13 will slide by the upper portion of the left-hand seat at a greater linear speed than they will slide by the lower portion of such seat.

As previously described, the coefficient of friction between these surfaces will vary in accordance with their relative sliding speed. Consequently, with the seal ring 34 of each seat made of "Teflon," as above described, the coefficient of friction between the lower portion of the inner end of the right-hand seat will be greater than the coefficient of friction of the upper portion thereof, and the coefficient of friction between the upper portion of the inner end of the left-hand seat will be greater than the coefficient of friction of the lower portion thereof. As a result, upon rotation of the plug between opened and closed positions, it will exert a greater frictional force in one circumferential direction on the lower portion of the inner end of the right-hand seat and the upper portion of the inner end of the left-hand seat than it will in the opposite circumferential direction upon the upper portion of the inner end of the right-hand seat and the lower portion of the inner end of the left-hand seat, respectively. Thus, this rotation of the plug will urge each of the seats in one rotational direction during movement from opened to closed positions and in an opposite rotational direction during movement of the plug from closed to opened positions.

In order to cause each seat to rotate between different rotational positions relative to the plug upon each cycle of operation of the valve, there are brakes or one-way clutches 38 disposed between each seat and the flowway 12 through the body. As shown in FIG. 2, each clutch includes a ball 39 received within a pocket 40 in the outer circumference of the seat, the radially inward surface of which is tapered inwardly with respect to the axis of the seat. A spring 41 is disposed between the deep end of the groove 40 and the ball 39 so as to urge normally the ball to the shallow end of the taper. Thus, the clutch 38 will prevent rotation of the seat ring 29 relative to the body in one direction (from right to left as shown in FIG. 2) while permitting it in the opposite direction. In this way, upon opening and closing of the plug, each seat ring will be caused to move from one rotational position to another.

It will be appreciated that the disposal of the lower stem 20 on the plug to one side of a vertical plane passing through the center of the plug permits the disposal of a drain plug 42 at the lowermost portion of the chamber. It will also be noted that this angular disposal of the stem 20 will minimize the outermost radial extension of the valve body with respect to the flowway axis, thereby saving valuable head room in many cases.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough, a ball-shaped plug rotatably mounted within the flowway for controlling flow therethrough, an annular seat rotatably mounted about its axis within the flowway and engaging at its inner end with said plug, the axis of rotation of said plug being disposed at an acute angle with respect to the axis of the seat so that the frictional engagement of the plug with the inner end of the seat during rotation of the plug in one direction will urge said seat in one rotational direction about its axis and during rotation of the plug in the other direction will urge said seat in the other rotational direction about its axis, and means providing greater resistance to the urging of said seat in said one direction than in said other direction.

2. A valve, comprising a body having a flowway therethrough, a ball-shaped plug within the flowway having an opening therethrough for alignment with the flowway to open same and disalignment therewith to close same, an annular seat mounted within the flowway for rotation about its axis in one direction and engagement at its inner end with one side of the plug, means mounting the plug for rotation between flowway opening and closing positions about an axis extending at an acute angle with respect to the axis of rotation of the seat so that the seat will be urged in a first rotational direction about its axis by the frictional engagement of the plug with the inner end thereof during opening movement of the plug and in the opposite rotational direction about its axis by the frictional engagement of the plug with the inner end thereof during closing movement of the plug, and means for opposing such urging of the seat about its axis in said other direction, whereby the seat is caused to assume successive rotational positions relative to said plug during operation of the valve.

3. A valve of the character defined in claim 2, wherein at least one of the inner ends of the seat and the surfaces of the plug engaged thereby is polytetrafluoroethylene.

4. A valve of the character defined in claim 2, wherein said opposing means comprises a one-way clutch between the seat and flowway.

5. A valve, comprising a body having a flowway therethrough, a ball-shaped plug having an opening therethrough and mounted within the flowway for rotation between the flowway-opening and closing positions, an annular seat rotatably mounted about its axis within the flowway, means urging the inner end of the seat into engagement with one side of the plug, and means between the seat and flowway for retarding rotation of the seat about its axis in one direction while permitting it in said other direction, the axis of rotation of the plug being disposed at an acute angle with respect to the axis of rotation of said seat so that the sliding engagement of the plug with the inner end of the seat, during rotation of said plug between flowway-opening and closing positions, is at a greater speed along one portion thereof than at another and said seat is thereby urged in a first rotational direction about its axis during opening movement of the plug and in an opposite rotational direction about its axis during closing movement of the plug.

6. A valve of the character defined in claim 5, wherein there is a ring sealing between the seat and flowway, and each of said ring and inner end of the seat is polytetrafluoroethylene.

References Cited by the Examiner

UNITED STATES PATENTS 2,712,454 7/1955 Love _____ 251—309 X
3,157,190 11/1964 Allen _____ 137—330

OTHER REFERENCES

Flom, D. G. et al.: Friction of Teflon Sliding on Teflon in Journal of Applied Physics, vol. 26, No. 9, September 1955, pp. 1088–1092.

WILLIAM F. O'DEA, *Primary Examiner.*

R. GERARD, *Examiner.*